United States Patent
Karabelas et al.

(10) Patent No.: US 9,976,681 B2
(45) Date of Patent: May 22, 2018

(54) FLUID SEALING

(75) Inventors: George Karabelas, Tyne and Wear (GB); Richard Alasdair Clements, Tyne and Wear (GB)

(73) Assignee: GE OIL & GAS UK LIMITED, Bristol (GB)

( * ) Notice: Subject to any disclaimer, the term of this patent is extended or adjusted under 35 U.S.C. 154(b) by 1246 days.

(21) Appl. No.: 14/113,691

(22) PCT Filed: Feb. 24, 2012

(86) PCT No.: PCT/GB2012/050425
§ 371 (c)(1),
(2), (4) Date: Oct. 24, 2013

(87) PCT Pub. No.: WO2012/146905
PCT Pub. Date: Nov. 1, 2012

(65) Prior Publication Data
US 2014/0049039 A1    Feb. 20, 2014

(30) Foreign Application Priority Data

Apr. 27, 2011    (GB) .................................. 1107014.1

(51) Int. Cl.
*F16L 33/01*    (2006.01)
*F16L 33/28*    (2006.01)
(Continued)

(52) U.S. Cl.
CPC ............... *F16L 33/01* (2013.01); *F16L 17/08* (2013.01); *F16L 33/18* (2013.01); *F16L 33/28* (2013.01)

(58) Field of Classification Search
CPC ............ F16L 33/01; F16L 33/18; F16L 33/28
(Continued)

(56) References Cited

U.S. PATENT DOCUMENTS 2,809,056 A * 10/1957 Kaiser ..................... F16L 33/01
285/222.2
2,940,778 A * 6/1960 Kaiser ..................... F16L 33/01
285/222.2
(Continued)

FOREIGN PATENT DOCUMENTS

CN          1046967 A     11/1990
CN        101473155 A      7/2009
(Continued)

OTHER PUBLICATIONS

Chinese Office Action for corresponding Chinese Application No. 201280020162.0 dated Jan. 23, 2015 and English translation.
(Continued)

*Primary Examiner* — David E Bochna
(74) *Attorney, Agent, or Firm* — Renner, Otto, Boisselle & Sklar, LLP (57) ABSTRACT

A fluid sealing element, a fluid sealing assembly, a method of providing a fluid seal, and a method of terminating a flexible pipe body in an end fitting are disclosed. The fluid sealing element (802) has an annular body portion locatable between an end fitting body (801) and an inner collar member (808) of an end fitting, and a tapered portion extending substantially perpendicular to the annular body portion at a radially inner region thereof. The method includes urging a fluid retaining layer (804) of a flexible pipe radially outwardly against an abutment surface of the inner collar member of the end fitting.

12 Claims, 7 Drawing Sheets

(51) Int. Cl.
*F16L 17/08* (2006.01)
*F16L 33/18* (2006.01)

(58) Field of Classification Search
USPC .................. 285/222.1, 222.2, 222.3, 222.4
See application file for complete search history.

(56) References Cited

U.S. PATENT DOCUMENTS

| | | | | |
|---|---|---|---|---|
| 3,415,545 | A | * 12/1968 | Frey | F16L 33/01 |
| | | | | 285/222.1 |
| 3,874,064 | A | 4/1975 | Chevalier | |
| 3,936,118 | A | * 2/1976 | Thiery | F16L 33/01 |
| | | | | 285/222.4 |
| 4,033,612 | A | * 7/1977 | Chevalier | F16L 33/01 |
| | | | | 285/222.4 |
| 4,950,001 | A | * 8/1990 | Briggs | F16L 33/01 |
| | | | | 285/222.1 |
| 5,860,682 | A | 1/1999 | Belcher | |
| 6,161,880 | A | * 12/2000 | Peppel | F16L 33/01 |
| | | | | 285/104 |
| 8,104,797 | B2 | * 1/2012 | Eccleston | F16L 33/01 |
| | | | | 285/222.1 |
| 2004/0036280 | A1 | * 2/2004 | Belcher | F16L 33/01 |
| | | | | 285/222.2 |
| 2009/0160184 | A1 | * 6/2009 | Vo | F16L 33/01 |
| | | | | 285/249 |
| 2013/0118629 | A1 | 5/2013 | Mezzalira | |

FOREIGN PATENT DOCUMENTS

| | | | |
|---|---|---|---|
| CN | 101490459 A | 7/2009 | |
| DE | 26 16 853 B1 | 8/1977 | |
| DE | 26 23 142 A1 | 11/1977 | |
| EP | 1 867 907 A1 | 12/2007 | |
| FR | 2816389 A1 * | 5/2002 | ............ F16L 33/003 |
| GB | 1 165 348 A | 9/1969 | |
| GB | 1 499 346 A | 2/1978 | |
| GB | 2 318 845 A | 5/1998 | |
| WO | WO 2007/144552 A1 | 12/2007 | |

OTHER PUBLICATIONS

International Search Report for corresponding International Application No. PCT/GB2012/050425 dated Oct. 26, 2012.

Form PCT/ISA/237 for corresponding International Application No. PCT/GB2012/050425 dated Oct. 26, 2012.

* cited by examiner

FLUID SEALING

TECHNICAL FIELD OF INVENTION

The present invention relates to a fluid seal, fluid seal assembly, a method of providing a fluid seal, and a method of terminating flexible pipe body in an end fitting. In particular, but not exclusively, the present invention relates to fluid seals for use in end fittings of flexible pipes.

Figure 1:
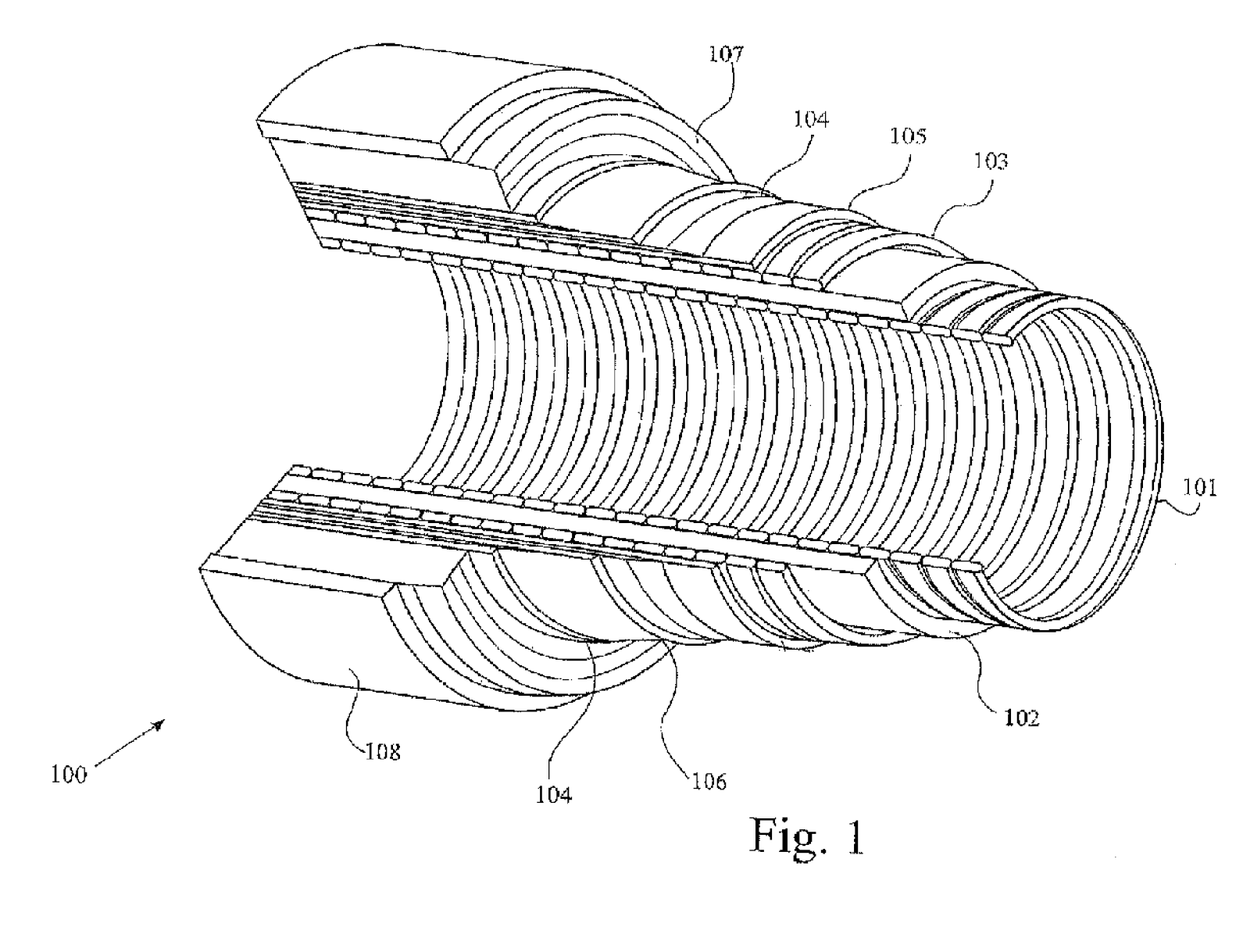
FIG. 1 illustrates a flexible pipe body.

Traditionally flexible pipe is utilised to transport production fluids, such as oil and/or gas and/or water, from one location to another. Flexible pipe is particularly useful in connecting a sub-sea location (which may be deep underwater) to a sea level location. Flexible pipe is generally formed as an assembly of a portion of flexible pipe body and one or more end fittings. The pipe body is typically formed as a combination of layered materials that form a pressure-containing conduit. A typical flexible pipe body is shown in FIG. 1, which will be further described below. The pipe structure allows large deflections without causing bending stresses that impair the pipe's functionality over its lifetime. The pipe body is generally built up as a composite structure including metallic and polymer layers.

Figure 2:
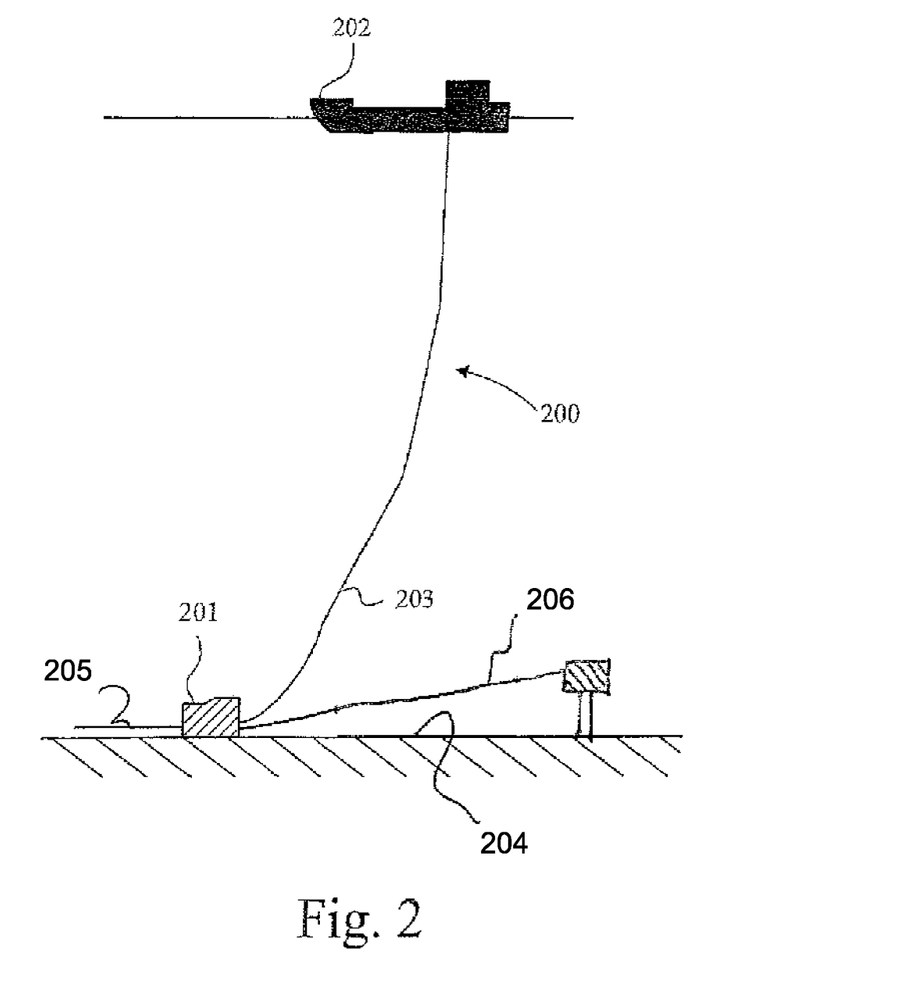
FIG. 2 illustrates a riser assembly.

The end fittings of a flexible pipe may be used for connecting segments of flexible pipe body together or for connecting them to terminal equipment such as a rigid sub-sea structures or floating facilities. As such, amongst other varied uses, flexible pipe can be used to provide a riser assembly for transporting fluids from a sub-sea flow line to a floating structure. In such a riser assembly a first segment of flexible pipe may be connected to one or more further segments of flexible pipe. Each segment of flexible pipe includes at least one end fitting. FIG. 2 illustrates a riser assembly 200 suitable for transporting production fluid such as oil and/or gas and/or water from a sub-sea location 201 to a floating facility 202.

Figure 3:
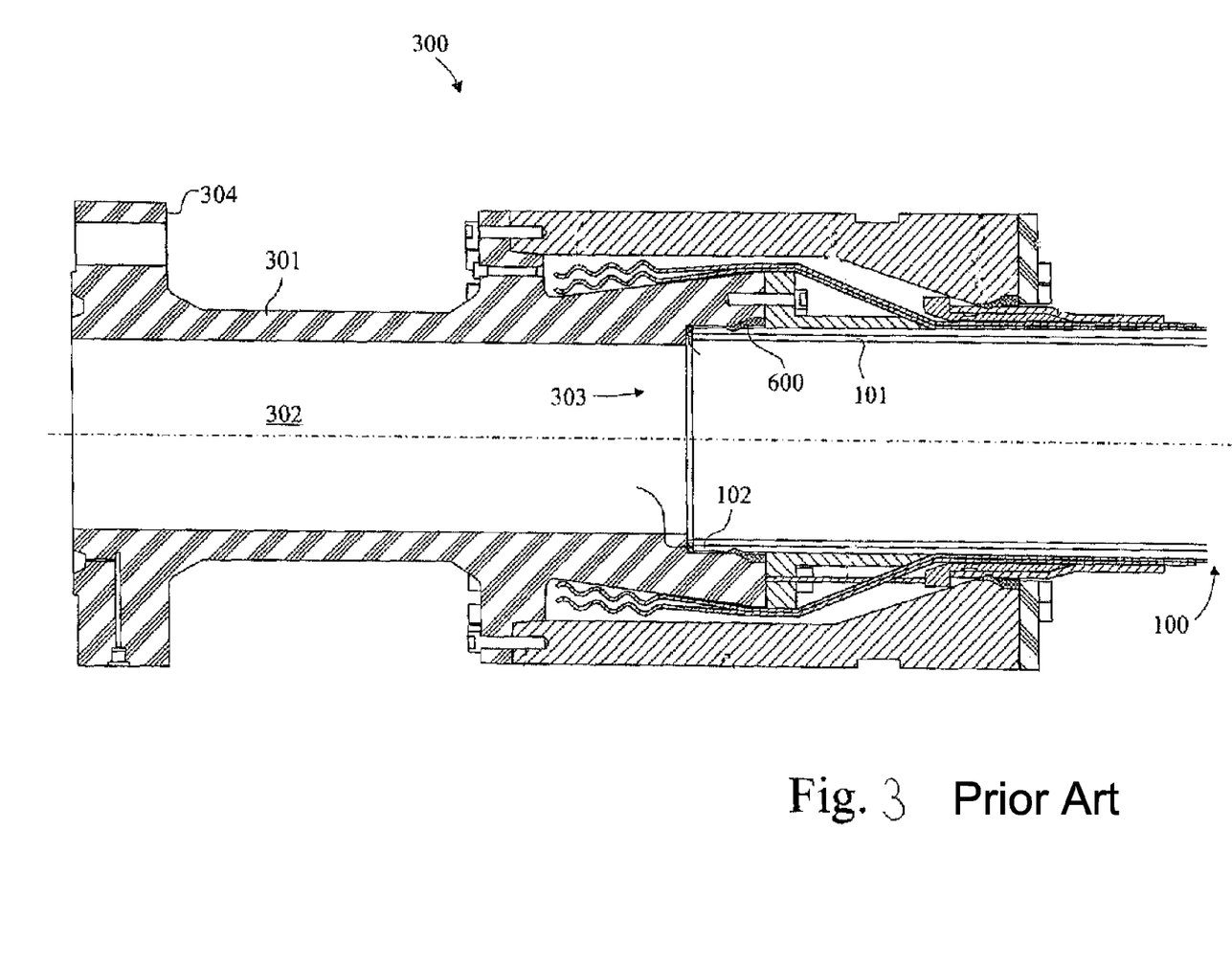
FIG. 3 illustrates a view of an end fitting of a flexible pipe with a known sealing ring arrangement.

A cross-section of a known end fitting assembly 300 is shown in FIG. 3. The end fitting 300 includes an end fitting body 301, which includes an internal bore 302 running along its length. The end fitting body is made from steel or other such rigid material. At a first end of the end fitting body 301 there is defined an open mouth region 303 into which an end of a segment of flexible pipe body 100 is located and then terminated. At a further end of the end fitting body 301 is a connector 304. This is formed as a substantially disk-like flared region on the end fitting body. The connector can be connected directly to a matching connector of a further end fitting body of an adjacent segment of flexible pipe body. This can be done using bolts or some other form of securing mechanism. In such a configuration the end fittings would be located in a back-to-back configuration. Alternatively the connector 304 may be connected to a floating or stationary structure such as a ship, platform or other such structure. Various layers of flexible pipe body are introduced to the end fitting assembly, cut to appropriate length, and sealingly engaged with a particular portion of the end fitting.

DISCUSSION OF RELATED ART

It is well-known that there are many varied problems associated with the provision of end fittings for ends of flexible pipe body. The end fittings must ensure both good fastening and good sealing. There is a need to seal the bore of the flexible pipe body with the bore of the end fitting. Particular problems occur when the various specific layers of the multi-layer flexible pipe body are terminated. The flexible pipe body may include layers having very different material characteristics such as single polymer layers and/or interlocked metallic layers. The termination of each of these layers in an end fitting brings with it characteristic problems. For example, flexible pipe body typically includes a fluid-retaining layer (known as a barrier layer or liner) formed generally as a polymer sheath or pressure sheath. Such a layer operates as a primary fluid retaining layer. To prevent rupture of such a layer caused by the pressure of the transported fluid, an interlocked wire layer (known as a pressure armour layer) is often located radially outwards of the fluid-retaining layer. If a pressure armour layer is not supported along its length, it is possible for portions of the fluid-retaining layer or other such underlying layer to burst through under pressure and cause failure of the terminating structure.

Traditionally when flexible pipe body is terminated in an end fitting a metal sealing ring 600 is inserted over the top of the barrier layer 102 (which is made of polymer), and into the body of an end fitting (made of metal), as shown in FIG. 3 for example. WO2007/144552 discloses an end fitting including a sealing ring.

Figure 4:
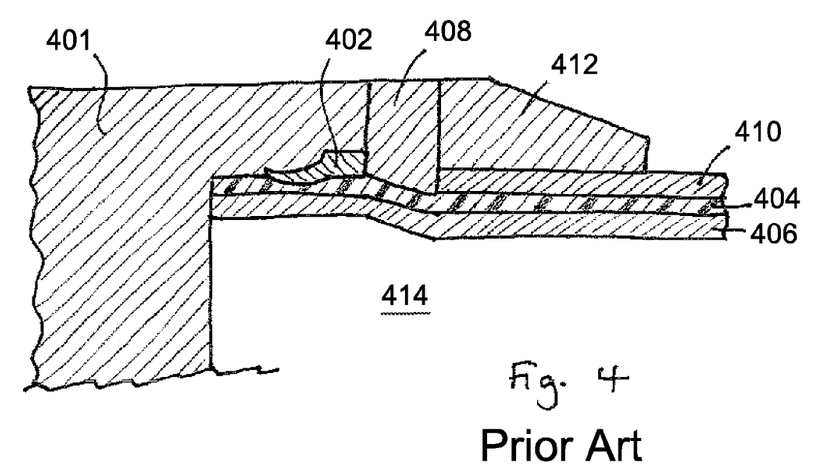
FIG. 4 illustrates a further view of a known sealing ring arrangement.

FIG. 4 shows an enlarged view of a known sealing ring 402. In use, the ring is located over a barrier layer 404 (or liner when there is no carcass 406), and between a portion of end fitting body 401 and an inner collar 408. FIG. 4 also shows a pressure armour layer 410 and a further collar member 412 for context. The sealing ring 402 may be of metal or a composite of metallic and elastomeric parts. The ring is a substantially ring shaped piece having a substantially rectangular body for abutting against the inner collar 408. The ring also includes a wedge-like section arranged to engage with a surface of the end fitting body. As the end fitting body is drawn towards the collar member, the end fitting body engages with the sealing ring. This tends to urge the sealing ring to the right in FIG. 4, until the ring meets the inner collar. Further movement of the end fitting body deforms the wedge-like portion of the sealing ring so as to urge the ring into a close sealing configuration with the barrier layer. A seal is formed by a swaging action, which causes deformation of the sealing ring and compression of the polymer layer below. A predetermined amount of squeeze on the polymer and a high preload are required to achieve a tight seal with the polymer barrier layer and metal end fitting body.

Figure 5:
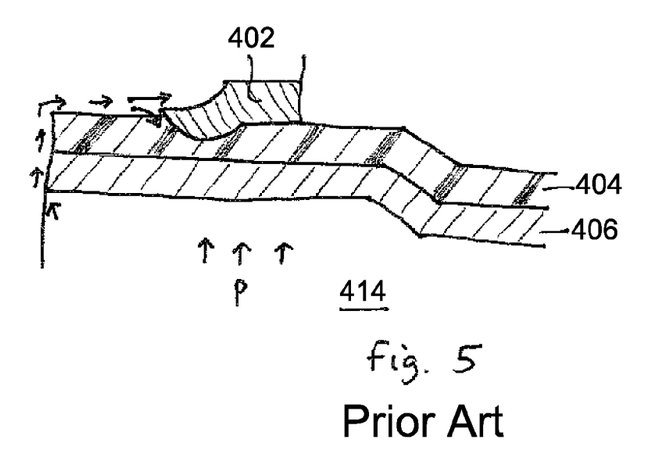
FIG. 5 illustrates an expanded view of the sealing ring arrangement of FIG. 4.

Some known arrangements have certain drawbacks, such as a tendency to leak when subjected to very high pressures (such as those experienced deep under water). For example, the sealing ring configuration of FIG. 4 may be open to disassembly caused by pressure and internal fluid acting on the arrangement. As shown in FIG. 5, pressure P from the fluid (such as oil or gas) in the pipe bore 414 acts radially outwards on the flexible pipe. The bore fluid, at high pressure, will also seek a pathway to enter any weak points of the end fitting/flexible pipe body assembly. It may be possible therefore at certain pressures that fluid can travel between the cut end of the barrier layer 404 and the end fitting body 401 and then along the sides of the wedge-like section of the seal, as shown by the arrows in FIG. 5, parting the seal from the barrier layer. This acts against the task of the sealing ring of preventing fluid from passing into the end fitting and flexible pipe body.

Furthermore, the sealing ring must seal against both the polymer barrier layer and the metal inner collar. The sealing ring must be hard enough to seal against the barrier layer and soft enough to deform against the inner collar during swaging, which gives rise to a technical compromise in the material selected for the sealing ring. What's more, the metal sealing ring may be required to seal in 3 directions, i.e. between the metal inner collar, the metal end fitting body and the polymer barrier layer, and the seals are both metal to metal, and metal to polymer. Again there will always be a compromise in the selection of materials for the sealing element. That is, the optimum material of a ring sealing against metal may be different to the optimum material for a ring sealing against a polymer.

SUMMARY OF THE INVENTION

It is an aim of the present invention to at least partly mitigate the above-mentioned problems.

It is an aim of embodiments of the present invention to provide an improved sealing ring element and methods of sealing layers of flexible pipe body.

It is an aim of embodiments of the present invention to provide a sealing ring element that has enhanced sealing properties, particularly when used in high pressure applications.

According to a first aspect of the present invention there is provided a method of providing a fluid seal between a fluid retaining layer of a flexible pipe and an end fitting, the method comprising:
 urging a fluid retaining layer of a flexible pipe radially outwardly against an abutment surface of an inner collar member of an end fitting.

According to a second aspect of the present invention there is provided a method of terminating flexible pipe body in an end fitting, comprising:
 cutting an end of a fluid retaining layer of the pipe body;
 locating a tapered portion of a sealing ring element under an end region of the fluid retaining layer; and
 securing an inner collar member to an end fitting body whereby a body portion of the sealing ring element is located between the inner collar member and end fitting body, the tapered portion of the sealing ring element is urged under the end region of the fluid retaining layer thereby urging the fluid retaining layer radially outwardly against an abutment surface of the inner collar member, and a seal element located between the body portion of the sealing ring element and the end fitting body is energised.

According to a third aspect of the present invention there is provided a flexible pipe comprising an end fitting and a flexible pipe body, the flexible pipe body including a fluid retaining layer, wherein a sealing ring element is provided such that a body portion of the sealing ring element is located between a body of the end fitting and an inner collar member, and a tapered portion of the sealing ring element is located radially inwards of an end region of the fluid retaining layer such that the fluid retaining layer is urged radially outwards against an abutment surface of the inner collar member.

According to a fourth aspect of the present invention there is provided a sealing ring element for providing a fluid seal between a fluid retaining layer of a flexible pipe and an end fitting, comprising:
 an annular body portion locatable between an end fitting body and an inner collar member of the end fitting; and
 a tapered portion extending substantially perpendicular to the annular body portion at a radially inner region thereof; wherein
 the annular body portion further comprises a sealing seat in a first side wall of the annular body portion, said side wall facing away from the direction in which the tapered portion extends.

Certain embodiments of the present invention provide improved sealing elements, assemblies and fluid sealing methods. In certain embodiments, pressure from fluid in a flexible pipe bore acts with the sealing ring to provide a tighter seal between the sealing ring, a polymer layer and an inner collar member. In known arrangements, fluid pressure works against the sealing ring. Certain embodiments of the present invention provide the advantage that the material of the sealing ring can be specifically chosen to optimise the seal between the sealing ring itself and the polymer barrier layer. Certain embodiments may include a further sealing mechanism to seal between the sealing ring and an adjacent inner collar member and/or end fitting body.

BRIEF DESCRIPTION OF THE DRAWINGS

Embodiments of the present invention will now be described hereinafter, by way of example only, with reference to the accompanying drawings in which:
FIG. 7b shows a further view of the sealing ring of FIG. 7a.

DETAILED DESCRIPTION OF THE INVENTION

Throughout this description, reference will be made to a flexible pipe. It will be understood that a flexible pipe is an assembly of a portion of a pipe body and one or more end fittings in each of which a respective end of the pipe body is terminated. FIG. 1 illustrates how pipe body 100 is formed in accordance with the present disclosure from a combination of layered materials that form a pressure-containing conduit. Although a number of particular layers are illustrated in FIG. 1, it is to be understood that the present invention is broadly applicable to coaxial pipe body structures including two or more layers manufactured from a variety of possible materials. It is to be further noted that the layer thicknesses are shown for illustrative purposes only.

As illustrated in FIG. 1, a pipe body 100 includes an optional innermost carcass layer 101. The carcass provides an interlocked construction that can be used as the innermost layer to prevent, totally or partially, collapse of an internal pressure sheath 102 due to pipe decompression, external pressure, and tensile armour pressure and mechanical crushing loads. It will be appreciated that certain embodiments of the present invention are applicable to 'smooth bore' operations (i.e. without a carcass) as well as such 'rough bore' applications (with a carcass).

The internal pressure sheath 102 acts as a fluid retaining layer and comprises a polymer layer that ensures internal fluid integrity. It is to be understood that this layer may itself comprise a number of sub-layers. It will be appreciated that when the optional carcass layer is utilised the internal pressure sheath is often referred to by those skilled in the art as a barrier layer. In operation without such a carcass (so-called smooth bore operation) the internal pressure sheath may be referred to as a liner.

An optional pressure armour layer 103 is a structural layer with a lay angle close to 90° that increases the resistance of the flexible pipe to internal and external pressure and mechanical crushing loads. The layer also structurally supports the internal pressure sheath, and typically consists of an interlocked construction.

The flexible pipe body also includes an optional first tensile armour layer 105 and optional second tensile armour layer 106. Each tensile armour layer is a structural layer with a lay angle typically between 10° and 55°. Each layer is used to sustain tensile loads and internal pressure. The tensile armour layers are often counter-wound in pairs.

The flexible pipe body shown also includes optional layers of tape 104 which help contain underlying layers and to some extent prevent abrasion between adjacent layers.

The flexible pipe body also typically includes optional layers of insulation 107 and an outer sheath 108, which comprises a polymer layer used to protect the pipe against penetration of seawater and other external environments, corrosion, abrasion and mechanical damage.

Each flexible pipe comprises at least one portion, sometimes referred to as a segment or section of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

FIG. 2 illustrates a riser assembly 200 suitable for transporting production fluid such as oil and/or gas and/or water from a sub-sea location 201 to a floating facility 202. For example, in FIG. 2 the sub-sea location 201 includes a sub-sea flow line. The flexible flow line 205 comprises a flexible pipe, wholly or in part, resting on the sea floor 204 or buried below the sea floor and used in a static application. The floating facility may be provided by a platform and/or buoy or, as illustrated in FIG. 2, a ship. The riser assembly 200 is provided as a flexible riser, that is to say a flexible pipe 203 of one or more sections of pipe body, connecting the ship to the sea floor installation. The flexible pipe may be in segments of flexible pipe body with connecting end fittings.

It will be appreciated that there are different types of riser, as is well-known by those skilled in the art. Embodiments of the present invention may be used with any type of riser, such as a freely suspended (free, catenary riser), a riser restrained to some extent (buoys, chains), totally restrained riser or enclosed in a tube (I or J tubes).

FIG. 2 also illustrates how portions of flexible pipe can be utilised as a flow line 205 or jumper 206.

Figure 6:
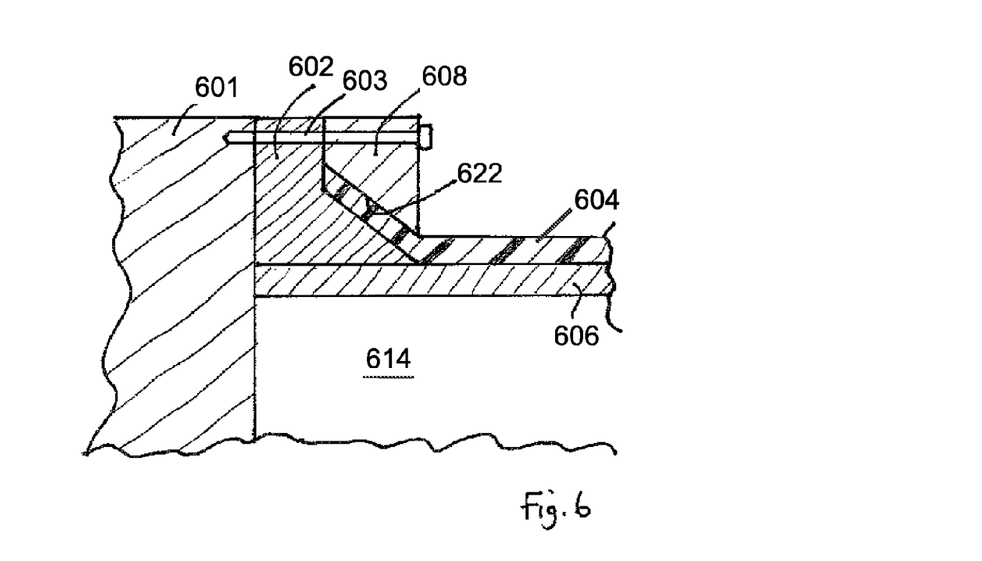
FIG. 6 illustrates a sealing ring arrangement.

FIG. 6 illustrates an example of a sealing ring arrangement according to the present invention. Sealing ring 602 is used to form a seal between an end of a barrier layer 604 and an inner collar 608.

Figure 7A:
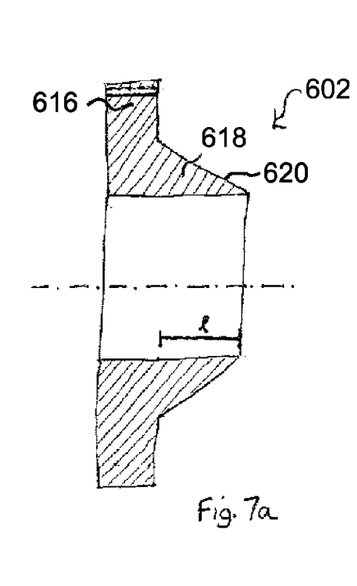
FIG. 7a illustrates the sealing ring of FIG. 6 in more detail.
Figure 7B:
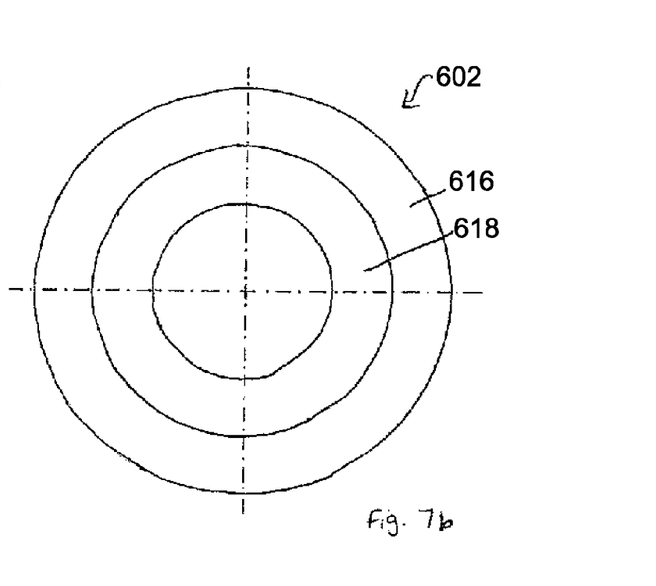

The sealing ring 602 is further illustrated in FIGS. 7a and 7b. The ring 602 may be a one-piece structure formed of metal, for example. Alternatively, the ring may consist of two or more components that are separately made and joined to form a unit structure. The ring 602 is a substantially annular piece (when viewed from one end as shown in FIG. 7b) having a body with substantially rectangular cross-section (when viewed from the side as shown in FIG. 7a). A neck 618 extends from an edge of the body 616 as a wedge-like section, tapering away from the body. The neck 618 extends from the body such that a flat, radially innermost surface of the body is continued, to give a surface for locating against an outer surface of a carcass layer 606. The neck is provided having a length l such that a sufficient length of the barrier layer is squeezed upwards towards the inner collar. Aptly the length of the neck may be 2 times the thickness of the barrier layer, or more. The sealing ring 602 has an opening 603 for enabling a securing element such as a bolt to pass through the body portion to secure the inner collar to the end fitting body. The neck (tapered portion) includes a cylindrical inner surface extending substantially perpendicular to first and second spaced apart and substantially parallel side walls of the annular body portion, and a barrier layer contact surface extends radially inwardly from the second side wall to the inner surface of the tapered portion. Aptly an angle between the barrier layer contact surface and the inner surface is between 5 and 30°

The sealing ring 602 is located at a region between an end fitting body 601 and an inner collar 608. The ring 602 is positioned to face away from the end fitting body 601 and lays radially outwards of the carcass 606. The neck 618 has an abutment surface 620 that is urged under the barrier layer 604 and against a radially inner surface of the barrier layer 604. The barrier layer and sealing ring are brought together until the end of the barrier layer contacts the body 616 of the sealing ring. In this way, the end region of the barrier layer 604 is urged by the sealing ring, radially outwardly, to urge the barrier layer 604 against an abutment surface 622 of the inner collar 608. The neck 618 forms a close sealing configuration with the barrier layer.

Of course the order in which the components are put in place need not be as described above. The components may be assembled in any order such that the barrier layer is urged against the inner collar, such as is shown in FIG. 6.

With the above-described arrangement, the barrier layer 604 is sealed against the inner collar 608 to form a fluid tight seal at the barrier layer termination that can withstand high pressures exerted by internal bore fluid.

In use, when fluid is present in the pipe bore 614, the fluid will create a radially outward pressure against the underside of the sealing ring 602. This pressure will further help to urge the barrier layer 604 radially outwardly against the abutment surface 622 of the inner collar 608. Increased pressure from the bore will further assist the forming of a tight seal. Thus, the pressure limits in which the system can operate can be extended.

Moreover, the arrangement will be less prone to disassembly caused by fluid leaking into and between the adjoining surfaces of the assembly, since the sealing ring creates a sizeable physical barrier to fluid, with its broadest faces closest to any point of leakage.

The angle of the taper and length of the neck 618 can be predetermined so as to give the barrier layer 604 a smooth lift-off (a suitable radius of curvature) away from the carcass 606. As such the tapered neck may not have a straight edge in cross section (as FIG. 7a) and may have a curved edge in cross section.

In addition, when devising a sealing ring suitable to deform a polymer barrier layer to an optimum amount, the deformation of the sealing ring, and the compression of the polymer barrier layer can be carefully considered so as to form a tight seal. In general, a metal to polymer seal forms a good seal, with the polymer deforming a larger amount than the metal. Thus the compression of the polymer barrier layer should be reasonably high so as to allow a good seal, without fracturing the barrier layer. The support to the barrier layer, such as that from an adjacent carcass, as well as pressure from the bore fluid, will influence the sealing ring and barrier layer fit. As such, metal is a suitable material for the sealing ring. The metal may be a high strength steel, alloy or inconel alloys, for example. Alternatively the sealing ring may be a composite structure of metallic and elastomeric parts, for example. Preferably the material resists cracking and is compatible with the bore fluids. A known method involves annealing the metal sealing ring so as to soften the metal, for improving the sealability between the sealing ring and barrier layer. However, with the present invention, such cold working of the sealing ring is not needed and preferably not used.

Figure 8:
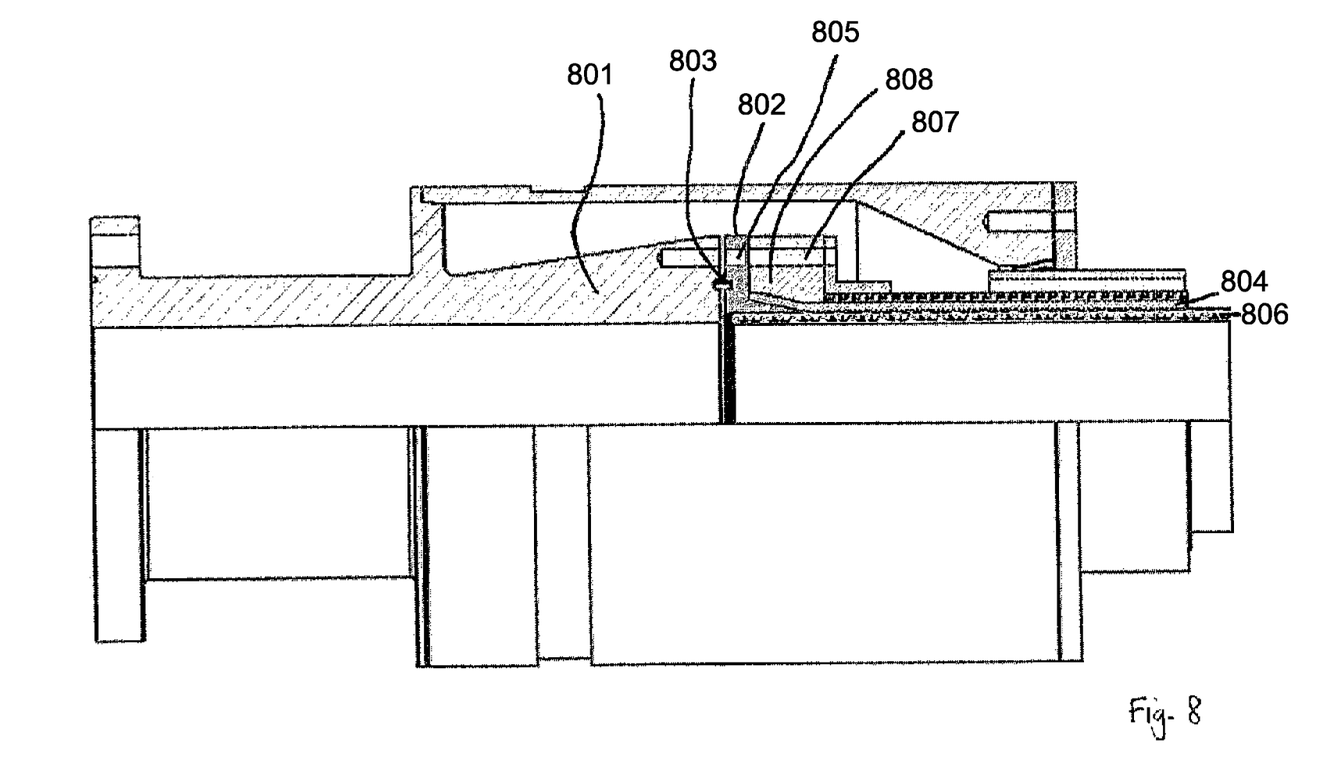
FIG. 8 illustrates another sealing ring arrangement.
Figure 9:
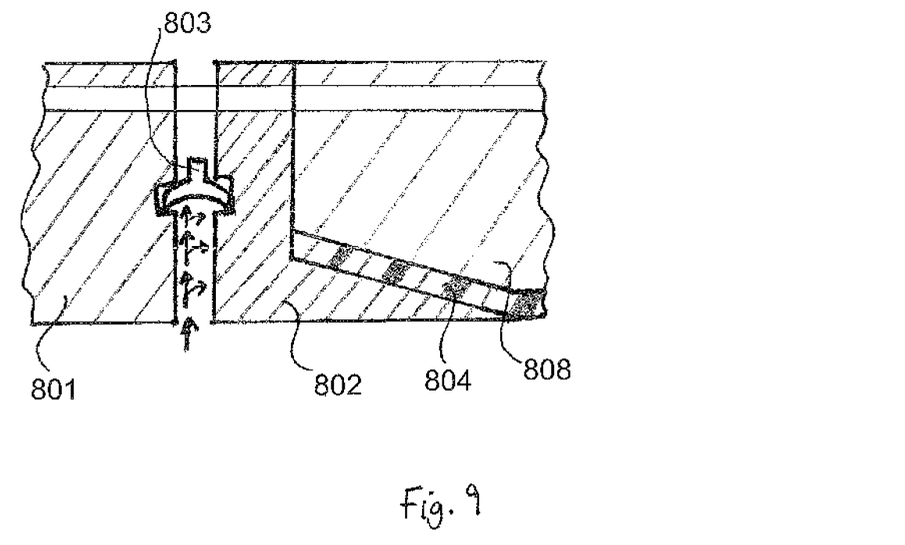
FIG. 9 illustrates the sealing ring of FIG. 8 in more detail.

Another embodiment of the present invention is shown in FIGS. 8 and 9. The sealing ring 802 is a similar configuration to the sealing ring 602. However, the sealing arrangement of this embodiment includes some further features as discussed below.

Sealing ring 802 includes a seal element 803, which in this example is a Grayloc® seal ring. The seal element 803 is provided between the end fitting body and the sealing ring body, in grooves (cut out portions) of the end fitting body and sealing ring at a point along the surface of the sealing ring adjoining the end fitting body. Aptly the seal element is provided part-way along such surface. Seal element 803 is of metal and forms a metal to metal seal with the end fitting body 801 and the sealing ring 802.

The seal element 803 has a generally inverted T-shaped cross-section (as shown in FIG. 9). The two arms of the 'T' form lip seals that create a sealing surface that can be deflected against sealing surfaces of the end fitting body and sealing ring. As pressure from bore fluid is directed towards the seal element 803, the seal element becomes energised under pressure and creates a stronger fluid-tight seal. When subjected to higher pressures, the pressure-sensitive configuration creates a higher compression (squeeze) on the barrier layer 804. That is, bore fluid at a particular pressure may enter the sealing area. This energises the seal element and creates a pushing force on the seal element to prevent fluid moving any further past the seal element. Pressure is then directed towards the sealing ring 802. The fluid path is shown by arrows in FIG. 9.

Additionally, the sealing ring 802 of this embodiment has a bore hole 805 forming an opening to enable a bolt or other securing element to pass through. The bolt 807 secures the inner collar 808 to the end fitting 801.

The flexible pipe assembly may be provided by cutting the ends of the carcass layer 806 and the barrier layer 804 to a suitable length, locating the tapered portion of the sealing ring 802 between the carcass layer and the barrier layer, positioning the seal element 803 in a groove of the sealing ring 802, bringing the end fitting body towards the sealing ring 802 and securing the inner collar 808 to the end fitting body 801 with the bolt 807.

Due to the dimensions of the seal element 803, it may not be possible to bring the sealing ring 802 directly adjacent to the end fitting body 801. In such a case, an insulating ring or other washer-type of element can be provided to plug the gap between the sealing ring 802 and end fitting body 801.

With the above embodiment, the barrier layer is urged radially outwards onto the inner collar, thus providing an effective seal against bore fluid. The sealing ring and seal element are each sealing against a specific part of the assembly and are designed of particular dimensions and materials to carry out that specific duty. As such a compromise in material selection is not needed.

Figure 10:
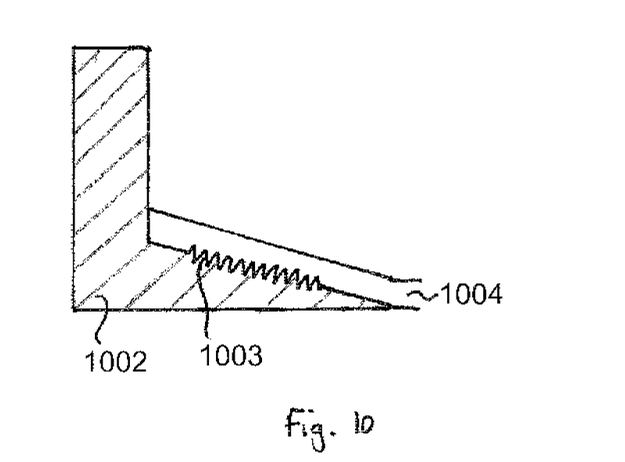
FIG. 10 illustrates another sealing ring.

In a further embodiment the sealing ring 1002 is provided with teeth-like projections 1003 on the surface of the neck abutting with the barrier layer 1004. The teeth also help to hold the barrier layer in place and prevent axial movement of the barrier layer, for example when the flexible pipe body undergoes a bending movement. It is also possible to provide teeth-like projections on the surface of the inner collar abutting with the barrier layer for the same reason.

Various modifications to the detailed configuration as described above are possible. For example, although the sealing ring has been described in conjunction with a carcass layer, in some embodiments the carcass may be absent and the sealing ring located between the pipe bore and the barrier layer to urge the liner against the inner collar.

Although in the above embodiments the neck region extends from the base of the body giving a flat surface to the sealing ring, the neck could be provided in other formations (particularly when not used with a carcass). For example, the neck could be provided with two tapers, forming an isosceles triangle shape with the most acute angle being the contact point that is first urged under the barrier layer/liner.

Although the above embodiments have been described with a bolt extending from the inner collar, through the sealing ring and into the end fitting body, other arrangements are possible to fix the position of the elements. For example, in an arrangement in which the inner collar and end fitting body protrude higher (radially further out) than the sealing ring, the inner collar could be secured directly to the end fitting body without entering the sealing ring. Alternatively the inner collar could be secured directly to the sealing ring without being affixed to the end fitting body. That is, it is useful for the inner collar to be fixed to another element because the barrier layer will be forced against the inner collar in use. Of course because all of these elements are actually substantially annular in cross section from one end, the movement of the individual pieces will be limited after assembly.

Although an inner collar has been described, any block or other element that functions as a stable element for squeezing the barrier layer against may be used.

Although a Grayloc® seal has been described in relation to FIGS. 8 and 9, any gasket could be used to seal between the sealing ring and the end fitting body.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of providing a fluid seal between a fluid retaining layer of a flexible pipe body for transporting fluid from a subsea location and an end fitting, the method comprising:
    urging a fluid retaining layer of a flexible pipe radially outwardly against an abutment surface of an inner collar member of an end fitting;
    urging the fluid retaining layer by locating a tapered portion of a sealing ring element between a radially inner surface of an end region of the fluid retaining layer and a radially outer surface of a carcass layer of the flexible pipe and urging the tapered portion under the end region and locating an annular body portion of the sealing ring element between an end fitting body of the end fitting and the inner collar member as the inner collar member is secured to the end fitting,
    wherein the fluid retaining layer comprises a barrier layer.

2. The method as claimed in claim 1, further comprising:
    providing a seal element between the body portion of the sealing ring element and an abutment surface of the end fitting body.

3. The method as claimed in claim 2, further comprising:
    energising the sealing ring element as the inner collar member is secured to the end fitting.

4. The method as claimed in claim 1, further comprising:
    providing the fluid seal with a metal-polymer contact between the fluid retaining layer and the inner collar member.

5. The method as claimed in claim 1, further comprising:
    providing the fluid seal without a metal-polymer contact between the sealing ring element and the end fitting body.

6. A method of terminating flexible pipe body for transporting fluid from a subsea location in an end fitting, comprising:
    cutting an end of a fluid retaining layer of the pipe body;
    locating a tapered portion of a sealing ring element between a radially inner surface of an end region of the fluid retaining layer and a radially outer surface of a carcass layer of the flexible pipe; and
    securing an inner collar member to an end fitting body whereby a body portion of the sealing ring element is located between the inner collar member and end fitting body, the tapered portion of the sealing ring element is urged under the end region of the fluid retaining layer thereby urging the fluid retaining layer radially outwardly against an abutment surface of the inner collar member, and a seal element located between the body portion of the sealing ring element and the end fitting body is energised,
    wherein the fluid retaining layer comprises a barrier layer.

7. A flexible pipe for transporting fluid from a subsea location comprising an end fitting and a flexible pipe body, the flexible pipe body including a fluid retaining layer and a carcass layer located radially inwards of the fluid retaining layer, wherein a sealing ring element is provided such that a body portion of the sealing ring element is located between a body of the end fitting and an inner collar member, and a tapered portion of the sealing ring element is located between an end region of the fluid retaining layer and an end region of the carcass layer such that the fluid retaining layer is urged radially outwards against an abutment surface of the inner collar member.

8. The flexible pipe as claimed in claim 7, wherein the body portion of the sealing ring element is annular and the tapered portion of the sealing ring element extends substantially perpendicular to the annular body portion at a radially inner region thereof.

9. The flexible pipe as claimed in claim 7, wherein the inner collar member is secured to the body of the end fitting.

10. The flexible pipe as claimed in claim 7, further comprising a seal element in a sealing seat of the sealing ring element, the sealing seat provided in a side wall of the annular body portion, the side wall facing away from the direction in which the tapered portion extends.

11. A riser, flow line or jumper comprising the flexible pipe as claimed in claim 7.

12. A sealing ring element for providing a fluid seal between a fluid retaining layer of a flexible pipe for transporting fluid from a subsea location and an end fitting, the sealing ring comprising:
    an annular body portion locatable between an end fitting body and an inner collar member of the end fitting; and
    a tapered portion extending substantially perpendicular to the annular body portion at a radially inner region thereof; wherein
    the annular body portion further comprises a sealing seat in a first side wall of the annular body portion, said side wall facing away from the direction in which the tapered portion extends;
    wherein the tapered portion comprises a cylindrical inner surface extending substantially perpendicular to first and second spaced apart and substantially parallel side walls of the annular body portion and a fluid retaining layer contact surface extending radially inwardly from the second side wall to the inner surface of the tapered portion,
    wherein an angle between the fluid retaining layer contact surface and the inner surface is between 5° and 30°, and
    wherein said annular body portion comprises one or more openings for enabling securing elements to pass through the body portion when the inner collar member is secured to the end fitting body.

* * * * *